US011750369B2

(12) United States Patent
Teng et al.

(10) Patent No.: US 11,750,369 B2
(45) Date of Patent: Sep. 5, 2023

(54) CIRCUIT MODULE OF SINGLE ROUND ADVANCED ENCRYPTION STANDARD

(71) Applicant: Wistron NeWeb Corporation, Hsinchu (TW)

(72) Inventors: You-Tun Teng, Hsinchu (TW); Wen-Long Chin, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 203 days.

(21) Appl. No.: 17/405,016

(22) Filed: Aug. 17, 2021

(65) Prior Publication Data

US 2022/0337395 A1 Oct. 20, 2022

(30) Foreign Application Priority Data

Apr. 20, 2021 (TW) .................................. 110114114

(51) Int. Cl.
*H04L 9/06* (2006.01)
*G06F 21/72* (2013.01)
*G06F 7/523* (2006.01)

(52) U.S. Cl.
CPC ............ *H04L 9/0631* (2013.01); *G06F 21/72* (2013.01); *G06F 7/523* (2013.01); *H04L 2209/122* (2013.01)

(58) Field of Classification Search
CPC ....... H04L 9/06; H04L 9/0618; H04L 9/0631; H04L 2209/12; H04L 2209/122; G06F 21/70; G06F 21/71; G06F 21/72
See application file for complete search history.

(56) References Cited

U.S. PATENT DOCUMENTS

| 10,797,858 | B2* | 10/2020 | Suresh | .................... G09C 1/00 |
| 2019/0179618 | A1* | 6/2019 | Noor | .................... H04L 9/0637 |
| 2021/0390443 | A1* | 12/2021 | Chung | .................... H03K 19/20 |

FOREIGN PATENT DOCUMENTS

TW      I406138 B1    8/2013

* cited by examiner

*Primary Examiner* — D'Arcy Winston Straub
(74) *Attorney, Agent, or Firm* — Winston Hsu

(57) ABSTRACT

A single round advanced encryption standard circuit module includes a substitution byte/inverse substitution byte unit, configured to substitute elements of an input state array to generate an output state array and to respectively generate a first state array, a plurality of second state arrays, a third state array, a plurality of fourth state arrays and the output state array according to a first tier circuit unit, a second tier circuit unit, a third tier circuit unit, a fourth tier circuit unit and a fifth tier circuit unit; wherein the first state array, the plurality of second state arrays, the third state array and the plurality of fourth state arrays are represented by register-transfer level codes; wherein the substitution byte/inverse substitution byte unit is implemented by composite field arithmetic of sharing operators and operands.

13 Claims, 5 Drawing Sheets

and drawings.

CIRCUIT MODULE OF SINGLE ROUND ADVANCED ENCRYPTION STANDARD

BACKGROUND OF THE INVENTION

1. Field of the Invention

The present invention relates to a single round advanced encryption standard circuit module, and more particularly, to a single round advanced encryption standard circuit module of high data output efficiency and high area utilization efficiency.

2. Description of the Prior Art

With the advancement and improvement of wireless communication technology, wireless communication technology bandwidth is improved, resulting in improvement to transmission rates of messages of smart appliances, internet of things and internet of vehicles. With the above applications, how to maintain the security of data under a high data transmission rate is an important issue.

A conventional advanced encryption standard (AES) can be applied to data transmissions. When the AES encryption algorithm is implemented by hardware, however, a substitution byte step is a non-linear step with high complexity of computation. In order to avoid a long critical path of the AES encryption algorithm associated hardware circuit, the conventional AES usually performs the substitution with a lookup table. This implementation results in a relatively huge circuit area. Therefore, improvements are necessary to the prior art.

SUMMARY OF THE INVENTION

The present invention provides a single round advanced encryption standard circuit module to optimize hardware of the AES encryption algorithm and maintain a high data transmission rate.

An embodiment of the present invention discloses a single round advanced encryption standard circuit module, comprising: a substitution byte/inverse substitution byte unit, configured to substitute elements of an input state array to generate an output state array, wherein the substitution byte/inverse substitution byte unit includes: a first tier circuit unit, configured to generate a first state array according to the input state array; a second tier circuit unit, including a constant multiplicative square arithmetic circuit and a multiplicative arithmetic circuit, coupled to the first tier circuit unit and configured to generate a plurality of second state arrays according to the first state array; a third tier circuit unit, including a multiplicative inverse element circuit, coupled to the second tier circuit unit, configured to generate a third state array according to the plurality of second state arrays; a fourth tier circuit unit, including a plurality of multiplicative arithmetic circuits, coupled in parallel to the third tier circuit unit, configured to generate a plurality of fourth state arrays according to the third state array; and a fifth tier circuit unit, configured to generate the output state array according to the plurality of fourth state arrays; wherein the first state array, the plurality of second state arrays, the third state array and the plurality fourth state arrays are represented by register-transfer level codes; wherein the substitution byte/inverse substitution byte unit is implemented by composite field arithmetic (CFA) of sharing operators and operands.

These and other objectives of the present invention will no doubt become obvious to those of ordinary skill in the art after reading the following detailed description of the preferred embodiment that is illustrated in the various figures and drawings.

DETAILED DESCRIPTION

Advanced encryption standard (AES) is a symmetric-key block encryption algorithm and is capable of processing a block size with 128 bits, which divides unencrypted plaintext data into data blocks of 128 bits length and then performs multiple rounds of encryption/decryption processes for the data blocks, wherein a key for encryption and decryption is identical.

Bytes $x\_1$-$x\_15$ are sequentially generated after the plaintext data is divided into 128 bits of data blocks.

$$x\_1 - x\_15:$$
$$x\_0 = \{a\_127, a\_126, \ldots, a\_120\},$$
$$x\_1 = \{a\_119, a\_118, \ldots, a\_112\},$$
$$\ldots$$
$$x\_15 = \{a\_7, a\_6, \ldots, a\_0\},$$

wherein $x\_n$ denotes n-th byte input data and $a\_m$ denotes m-th input data.

Therefore, the AES algorithm is configured to perform the AddRoundKey for the plaintext data and a primary key, and then perform an add operation for the plaintext data and the key with multiple rounds, wherein each round includes steps of a SubBytes arithmetic, a ShiftRows arithmetic, a MixColumns arithmetic and an AddRoundKey arithmetic.

A conventional circuit hardware for implementing the above AES algorithm structure has the problems of a long critical path and high computational complexity; therefore, a single round advanced encryption standard circuit module according to an embodiment of the present invention is provided to shorten the critical path and reduce an area of the circuit hardware.

Figure 1:
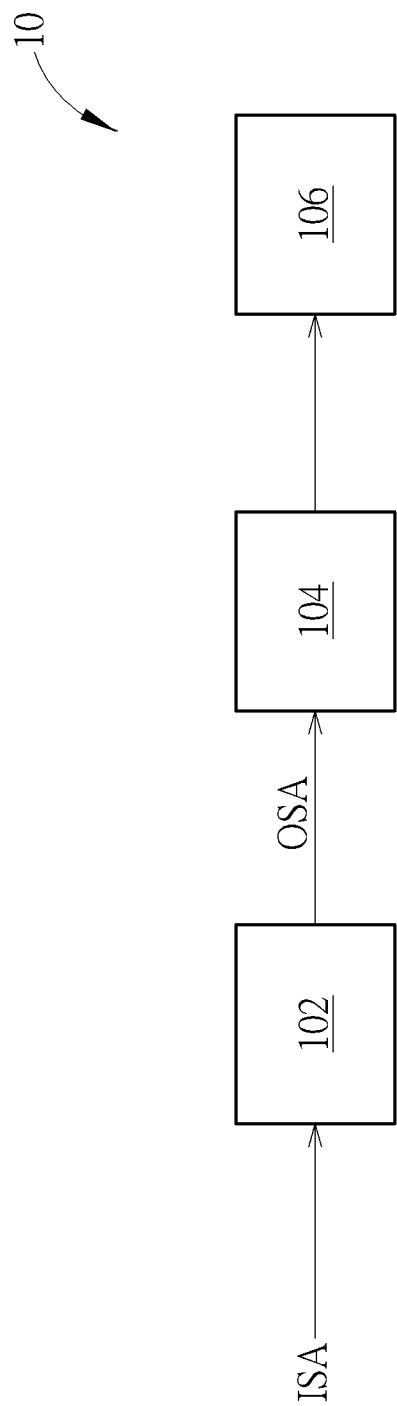
FIG. 1 is a schematic diagram of a single round advanced encryption standard circuit module according to an embodiment of the present invention.

Refer to FIG. 1, which is a schematic diagram of a single round advanced encryption standard circuit module 10 according to an embodiment of the present invention. The single round advanced encryption standard circuit module 10 includes a substitution byte/inverse substitution byte unit 102, a shift rows/inverse shift rows arithmetic unit 104 and a mix columns/inverse mix columns arithmetic unit 106. The substitution byte/inverse substitution byte unit 102 is configured to substitute each element of an input state array ISA to generate an output state array OSA, wherein the input state array ISA is generated by plaintext data. The shift rows/inverse shift rows arithmetic unit 104 is coupled to the substitution byte/inverse substitution byte unit 102 and is configured to perform a circular shift for the output state array OSA from the substitution byte/inverse substitution byte unit 102 to generate a fifth state array SA_5. The mix columns/inverse mix columns arithmetic unit 106 is coupled to the shift rows/inverse shift rows arithmetic unit 104 and is configured to perform a multiplicative arithmetic for the fifth state array SA_5.

When performing the AES encryption arithmetic, the substitution byte/inverse substitution byte unit 102 is configured to perform byte substitution arithmetic, which substitutes each element of the input state array ISA for another element. When performing AES decryption arithmetic, inverse byte substitution arithmetic is performed. The single round advanced encryption standard circuit module 10 according to an embodiment of the present invention is implemented based on a pipeline structure. Since the substitution byte/inverse substitution byte unit according to an embodiment of the present invention is implemented by composite field arithmetic (CFA) of sharing operators and operands, the critical path may be shortened and the circuit hardware area may be reduced when implementing the hardware.

Figure 2:
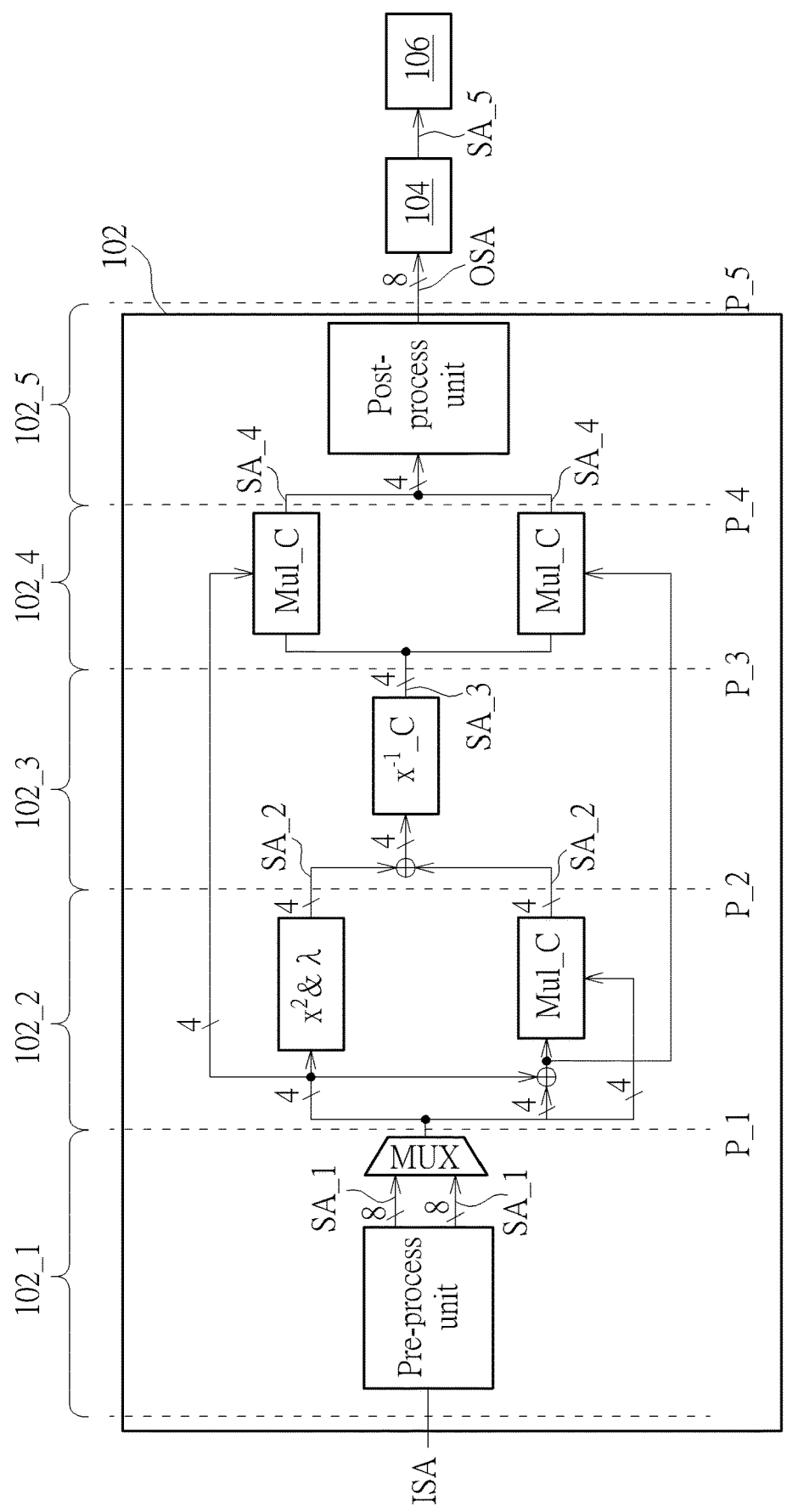
FIG. 2 is a schematic diagram of the single round advanced encryption standard circuit module according to an embodiment of the present invention.

In detail, refer to FIG. 2, which is a schematic diagram of the single round advanced encryption standard circuit module 10 according to an embodiment of the present invention. In this embodiment, the substitution byte/inverse substitution byte unit 102 of the single round advanced encryption standard circuit module 10 includes a first tier circuit unit 102_1, a second tier circuit unit 102_2, a third tier circuit unit 102_3, a fourth tier circuit unit 102_4 and a fifth tier circuit unit 102_5. The first tier circuit unit 102_1 may include a pre-process unit, configured to generate a first state array SA_1 according to the input state array ISA. The second tier circuit unit 102_2 includes a constant multiplicative square arithmetic circuit $x^2\&\lambda$ and a multiplicative arithmetic circuit Mul_c, and is coupled to the first tier circuit unit 102_1. The second tier circuit unit 102_2 is configured to generate a plurality of second state arrays SA_2 according to the first state array SA_1. The third tier circuit unit 102_3 includes a multiplicative inverse element circuit $x^{-1}$_c, coupled to the second tier circuit unit 102_2 and is configured to generate a third state array SA_3 according to the plurality of second state arrays SA_2. The fourth tier circuit unit 102_4 includes a plurality of multiplicative arithmetic circuits Mul_c, which are coupled in parallel to the third tier circuit unit 102_3, and the fourth tier circuit unit 102_4 is configured to generate a plurality of fourth state arrays SA_4 according to the third state array SA_3. The fifth tier circuit unit 102_5 may be a post-process unit, configured to generate the output state array OSA according to the plurality of fourth state arrays SA_4. Notably, the first state array SA_1, the plurality of second state arrays SA_2, the third state array SA_3, the plurality of fourth state arrays SA_4 are represented by register-transfer level codes.

Compared to the conventional technique, which utilizes S-box circuits to implement substitution byte/inverse substitution byte arithmetic, the present invention utilizes the CFA to shorten the critical path and reduce the circuit area. Further, since calculating inputs of multiplicative inverse element of GF(2) is required when performing the encrypted substitution byte arithmetic or decrypted inverse substitution byte arithmetic, transformations of $x^2$ of $GF((2^2)^2)$ and $GF(2^2)$ according to an embodiment of the present invention are respectively defined as follows.

Regarding $GF((2^2)^2)$, inputs of the multiplicative arithmetic circuit Mul_c are two sets of information with 4 bits each, and an output is one set of information with 4 bits. Assume that $GF((2^2)^2)$ includes: $k=\{k_3k_2k_1k_0\}_2$ denotes a multiplicative output, $q=\{q_3q_2q_1q_0\}_2$ denotes a first multiplicative input, $w=\{w_3w_2w_1w_0\}_2$ denotes a second multiplicative input, wherein bits $k_3$, $q_3$, $w_3$ are respectively a highest bit; bits $k_2$, $q_2$, $w_2$ are respectively a next highest bit; bits $k_1$, $q_1$, $w_1$ are respectively a next lowest bit; bits $k_0$, $q_0$, $w_0$ are respectively a lowest bit.

Figure 3:
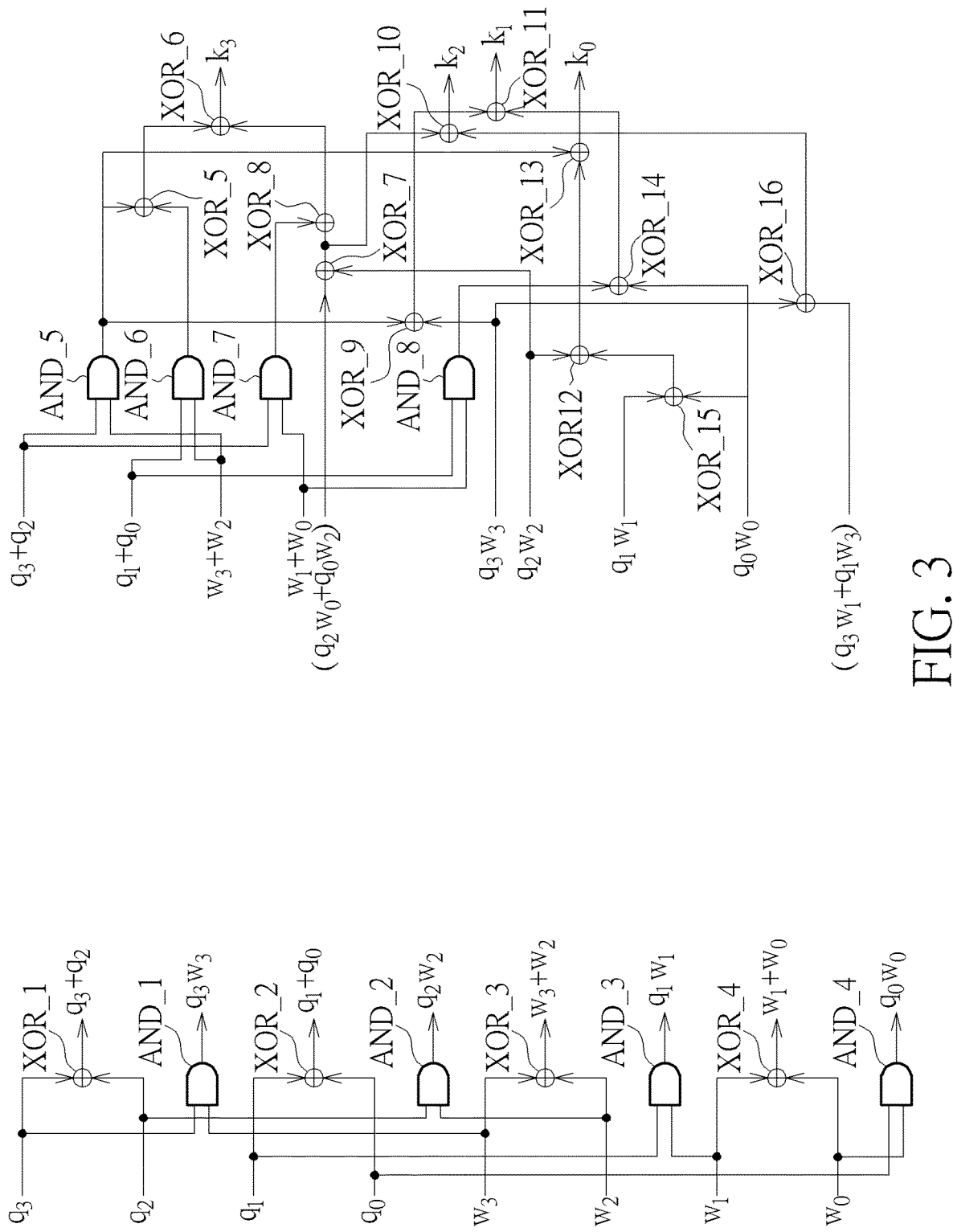
FIG. 3 is a schematic diagram of implementing a multiplicative arithmetic circuit of $GF((2^2)^2)$ according to an embodiment of the present invention.

Refer to FIG. 3, which is a schematic diagram of implementing the multiplicative arithmetic circuit Mul_c of $GF((2^2)^2)$ according to an embodiment of the present invention. The multiplicative arithmetic circuit Mul_c of $GF((2^2)^2)$ according to an embodiment of the present invention may implement k of the k=qw with the arithmetic hardware $(q_3+q_2)$ $(q_1+q_0)$ $(w_3+w_2)$, $(w_1+w_0)$, $q_3w_3$, $q_2w_2$, $q_1w_1$, $q_0w_0$ via the CFA.

As can be known from FIG. 3, the multiplicative arithmetic circuit Mul_c of $GF((2^2)^2)$ includes a plurality of XOR gates XOR_1-XOR_4 and a plurality of AND gates AND_1-AND_4, wherein the XOR gates XOR_1-XOR_4 are configured to respectively perform XOR calculations for the highest bit $q_3$ and the next highest bit $q_2$ of the first multiplicative input q, the lowest bit $q_0$ and the next lowest bit $q_1$ of the first multiplicative input q, the highest bit $w_3$ and the next highest bit $w_2$ of the second multiplicative input w, the lowest bit $w_0$ and the next lowest bit $w_1$ of the second multiplicative input w to respectively generate an XOR result. AND gates AND_1-AND_4 are configured to perform AND calculations for the highest bit $q_3$ of the first multiplicative input q and the highest bit $w_3$ of the second multiplicative input w, the next highest bit $q_2$ of the first multiplicative input q and the next highest bit $w_2$ of the second multiplicative input w, the next lowest bit $q_1$ of the first multiplicative input q and the next lowest bit $w_1$ of the second multiplicative input w, the lowest bit $q_0$ of the first multiplicative input q and the lowest bit $w_0$ of the second multiplicative input w to respectively generate an AND result.

Furthermore, the multiplicative arithmetic circuit Mul_c of $GF((2^2)^2)$ is configured to generate the multiplicative output $k=\{k_3k_2k_1k_0\}_2$ according to the XOR result, the AND result, AND gates AND_5-AND_8 and the XOR gates XOR_5-XOR_16. As such, the multiplicative arithmetic circuit Mul_c of $GF((2^2)^2)$ according to an embodiment of the present invention may reduce a number of XOR gates and AND gates in the circuit and reduce the circuit area relative to the conventional techniques.

Figure 4:
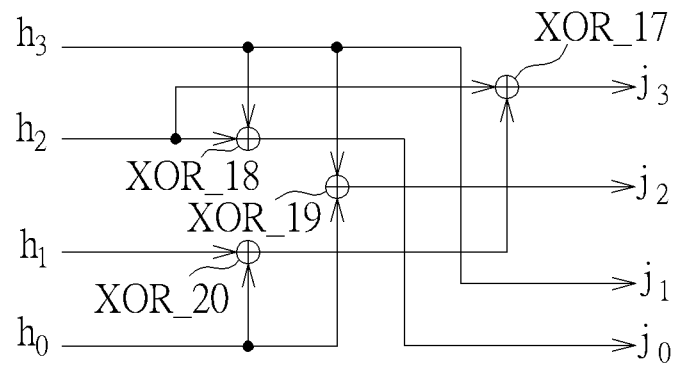
FIG. 4 is a schematic diagram of implementing a constant multiplicative square arithmetic circuit of $GF((2^2)^2)$ according to an embodiment of the present invention.

Refer to FIG. 4, which is a schematic diagram of implementing the constant multiplicative square arithmetic circuit $x^2\&\lambda$ of $GF((2^2)^2)$ according to an embodiment of the present invention. The constant A and the square arithmetic in the composite field are combined as a formula by the CFA, which implements the above constant multiplicative square arithmetic with a single module. The constant multiplicative square arithmetic circuit $x^2\&\lambda$ of $GF((2^2)^2)$ is configured to generate a constant multiplicative square output $j=\{j_3j_2j_1j_0\}_2$ according to a constant multiplicative square input $h=\{h_3h_2h_1h_0\}_2$. The constant multiplicative square arithmetic circuit $x^2\&\lambda$ includes a plurality of XOR gates XOR_17-XOR_20, configured to respectively perform the XOR calculation for a highest bit $h_3$ and a lowest bit $h_0$, the highest bit $h_3$ and a next highest bit $h_2$, the next highest bit $h_2$ and the next lowest bit $h_1$ of the constant multiplicative square input h to generate the constant multiplicative square output j. In this way, the constant multiplicative square arithmetic circuit $x^2\&\lambda$ of $GF((2^2)^2)$ according to an embodiment of the present invention may reduce a number of XOR gates utilized in the circuit and reduce the critical path relative to the conventional techniques.

Figure 5:
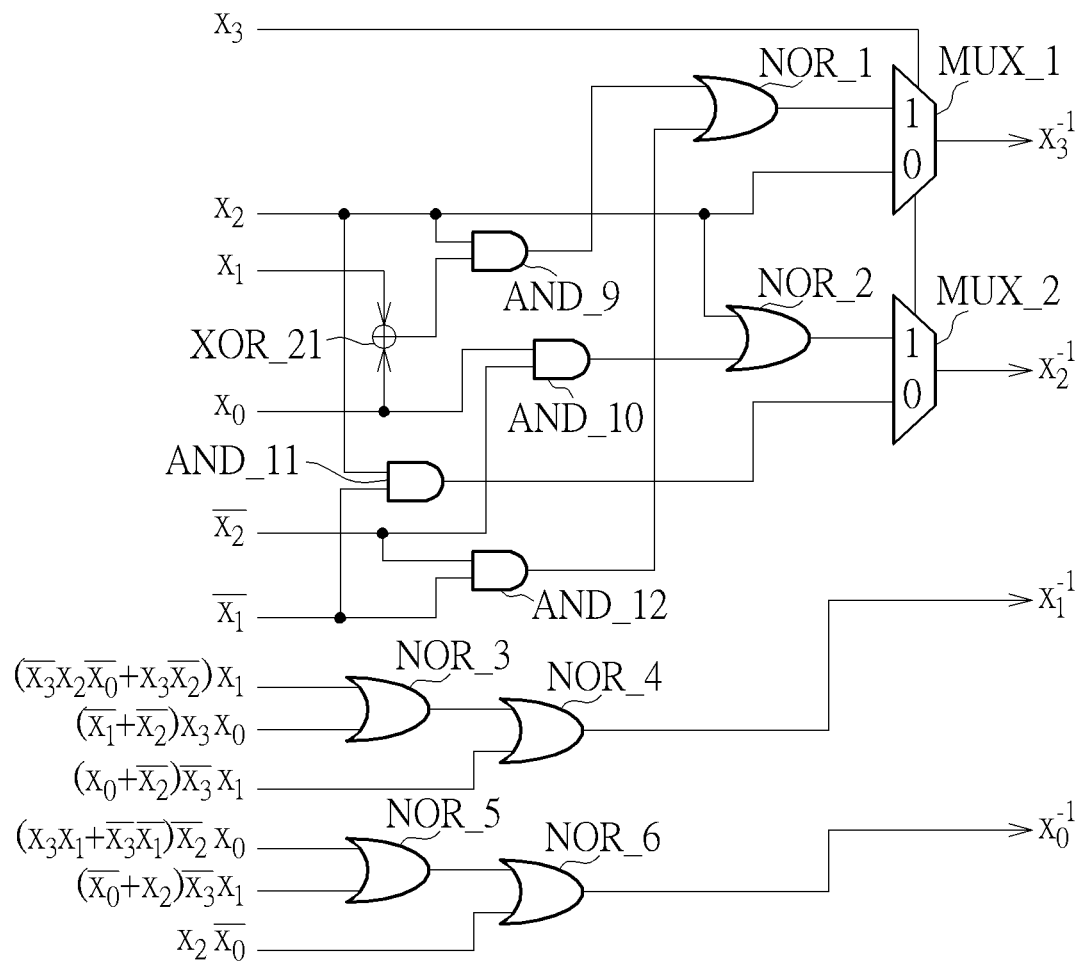
FIG. 5 is a schematic diagram of implementing a multiplicative inverse element circuit of $GF((2^2)^2)$ according to an embodiment of the present invention.

Refer to FIG. 5, which is a schematic diagram of implementing the multiplicative inverse element circuit $x^{-1}$_c of $GF((2^2)^2)$ according to an embodiment of the present invention. The multiplicative inverse element circuit $x^{-1}$_c is configured to generate a multiplicative inverse element output $x^{-1}=\{x_3^{-1}x_2^{-1}x_1^{-1}x_0^{-1}\}_2$ according to a multiplicative inverse element input $x=\{x_3x_2x_1x_0\}_2$. As shown in FIG. 5, the multiplicative inverse element circuit $x^{-1}$_c includes an XOR gate XOR_21, a plurality of NOR gates NOR_1-NOR_6, a plurality of AND gates AND_9-AND_12 and a plurality of multiplexers MUX_1, MUX_2, wherein the multiplicative inverse element circuit $x^{-1}$_c is configured to output the highest bit $\overline{x_3}$ and a next highest bit $\overline{x_2}$ of the multiplicative inverse element output $x^{-1}$ according to the multiplicative inverse element input $x=\{x_3x_2x_1x_0\}_2$, and a next highest bit $\overline{x2}$ and a next lowest bit $\overline{x_1}$ of negation $x=\{\overline{x_3x_2x_1x_0}\}_2$ of the multiplicative inverse element input x.

The multiplicative inverse element circuit $x^{-1}$_c is configured to output the lowest bit $x_0^{-1}$ and the next lowest bit $x_1^{-1}$ of the multiplicative inverse element output according to the multiplicative inverse element input x and negation $x=\{\overline{x_3x_2x_1x_0}\}_2$ of the multiplicative inverse element input x. Notably, the lowest bit $x_0^{-1}$ and the next lowest bit $x_1^{-1}$ of the multiplicative inverse element output are simplified by a Karnaugh map to reduce the circuit area in terms of hardware.

As can be known from FIG. 2, the input state array ISA of the second tier circuit unit 102_2 of the substitution byte/inverse substitution byte unit 102 according to an embodiment of the present invention is a selection result of the first state array SA_1 via a multiplexer MUX. The first multiplicative input q, the second multiplicative input w of the multiplicative arithmetic circuit Mul_c and the constant multiplicative square input h of the constant multiplicative square arithmetic circuit $x^2 \&\lambda$ of the second tier circuit unit 102_2 are determined by the selection result. The multiplicative inverse element input x of the multiplicative inverse element circuit $x^{-1}$_c of the third tier circuit unit 102_3 is determined by a result of XOR calculation of the second state arrays SA_2 of the second tier circuit unit 102_2. A first multiplicative input q and a second multiplicative input w of the multiplicative arithmetic circuit Mul_c of the fourth tier circuit unit 102_4 are determined by the third state array SA_3 of the third tier circuit unit 102_3.

In addition, since the single round advanced encryption standard circuit module 10 according to an embodiment of the present invention is implemented by a pipeline structure, one register set is implemented at a pipeline stage P 1 between the first tier circuit unit 102_1 and the second tier circuit unit 102_2, four register sets are implemented at a pipeline stage P 2 between the second tier circuit unit 102_2 and the third tier circuit unit 102_3, three register sets are implemented at a pipeline stage P 3 between the third tier circuit unit 102_3 and the fourth tier circuit unit 102_4, two register sets are implemented at a pipeline stage P 4 between the fourth tier circuit unit 102_4 and the fifth tier circuit unit 102_5, and two register sets are implemented at a pipeline stage P 5 between the fifth tier circuit unit 102_5 and the shift rows/inverse shift rows arithmetic unit 104, wherein a pipeline volume and a bit number of each register are identical, i.e. the first state array SA_1 includes 8 bits, the second state arrays SA_2, the third state array SA_3, and the fourth state arrays SA_4 include 4 bits, and the output state array OSA includes 8 bits.

Moreover, the first tier circuit unit 102_1 according to an embodiment of the present invention includes an isomorphism mapping module and an inversion affine transformation module, the fifth tier circuit unit 102_5 includes an inversion isomorphism mapping module and an affine transformation module.

The first tier circuit unit 102_1 according to an embodiment of the present invention is composed of the isomorphism mapping module and the inversion affine transformation module and includes two sets output with 8 bits each, wherein array formulas are described by the register-transfer level codes and performed logic synthesis by electronic design automation (EDA) to generate a circuit area smaller than that of combining two modules. Similarly, array formulas of an inversion isomorphism mapping module and an affine transformation module of the fifth tier circuit unit 102_5 may be described by the register-transfer level codes and performed logic synthesis by EDA to generate a circuit area smaller than that of combining two modules.

Figure 6:
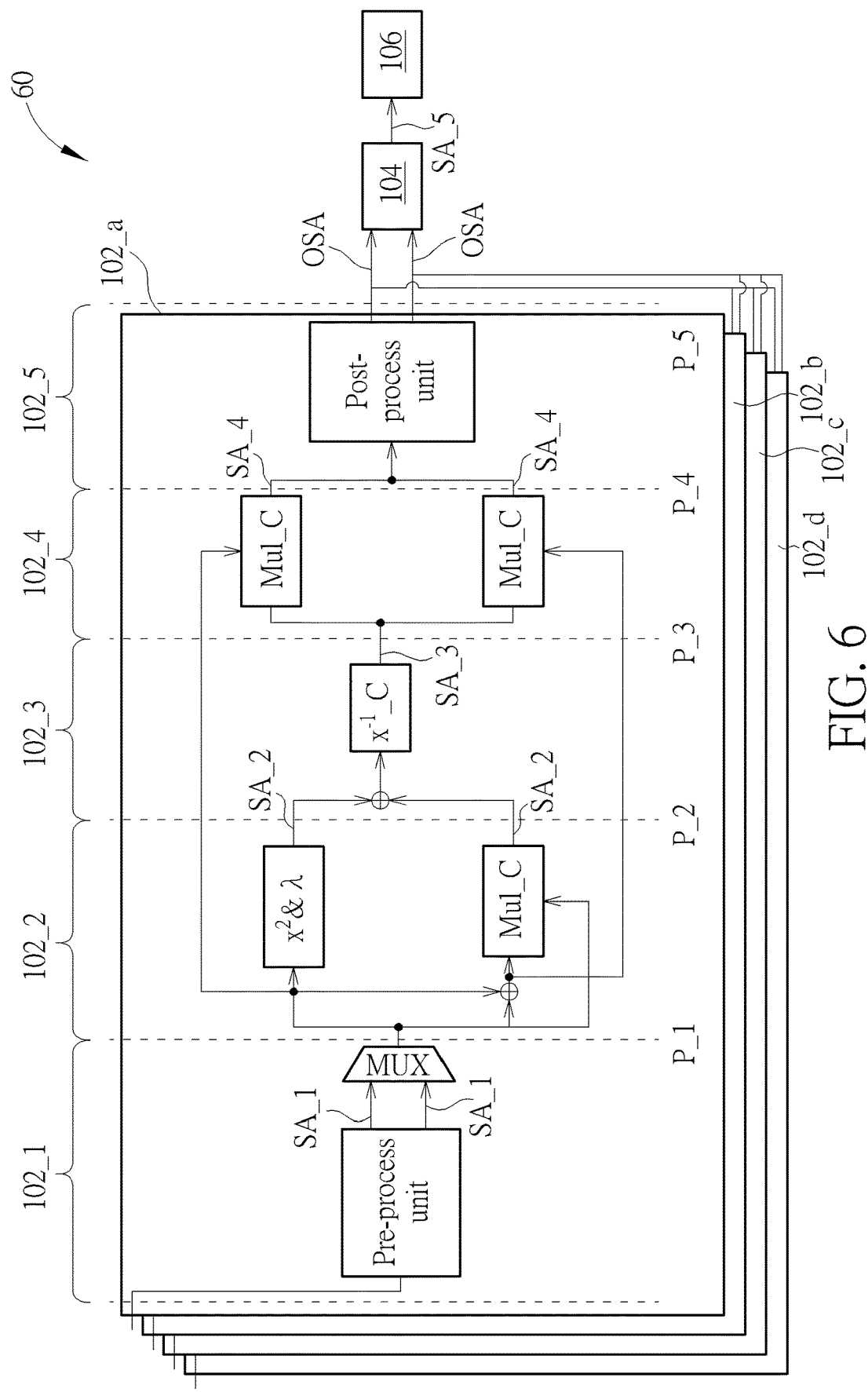
FIG. 6 is a schematic diagram of another single round advanced encryption standard circuit module according to an embodiment of the present invention.

Refer to FIG. 6, which is a schematic diagram of another single round advanced encryption standard circuit module 60 according to an embodiment of the present invention. Since the single round advanced encryption standard circuit module 60 is a variation of the single round advanced encryption standard circuit module 10, the single round advanced encryption standard circuit module 60 inherits the element numbers of the single round advanced encryption standard circuit module 10 with identical functions. Different from the single round advanced encryption standard circuit module 10 in FIG. 1, the single round advanced encryption standard circuit module 60 includes four substitution byte/inverse substitution byte units 102_a-102-d, the output state array OSA, received by the shift rows/inverse shift rows arithmetic unit 104, from the four substitution byte/inverse substitution byte units 102_a-102-d has 32 bits, and the fifth state array SA_5, received by the mix columns/inverse mix columns arithmetic unit 106, from the shift rows/inverse shift rows arithmetic unit 104 has 32 bits. Notably, a number of substitution byte/inverse substitution byte unit is not limited to the above examples, and thereby bit numbers of the first state array SA_1-SA_5 and the output state array OSA may be modified according to allocations of the circuit and not limited thereto.

In summary, the present invention provides a single round advanced encryption standard circuit module, which utilizes composite field arithmetic to shorten the critical path, and reduces register numbers with circuit pipeline to reduce the circuit area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A single round advanced encryption standard circuit module, comprising:
a substitution byte/inverse substitution byte unit, configured to substitute elements of an input state array to generate an output state array, wherein the substitution byte/inverse substitution byte unit comprises:
a first tier circuit unit, configured to generate a first state array according to the input state array;
a second tier circuit unit, including a constant multiplicative square arithmetic circuit and a multiplicative arithmetic circuit, coupled to the first tier circuit unit and configured to generate a plurality of second state arrays according to the first state array;
a third tier circuit unit, including a multiplicative inverse element circuit, coupled to the second tier circuit unit, configured to generate a third state array according to the plurality of second state arrays;
a fourth tier circuit unit, including a plurality of multiplicative arithmetic circuits, coupled in parallel to the third tier circuit unit, configured to generate a plurality of fourth state arrays according to the third state array; and
a fifth tier circuit unit, configured to generate the output state array according to the plurality of fourth state arrays;
wherein the first state array, the plurality of second state arrays, the third state array and the plurality fourth state arrays are represented by register-transfer level codes;
wherein the substitution byte/inverse substitution byte unit is implemented by composite field arithmetic (CFA) of sharing operators and operands;
wherein the multiplicative arithmetic circuit is configured to generate a multiplicative output according to a first multiplicative input and a second multiplicative input, wherein the first multiplicative input and the second multiplicative input respectively includes four bits, and the multiplicative arithmetic circuit comprises:
a plurality of XOR gates, configured to respectively perform XOR calculation for a highest bit and a next highest bit of the first multiplicative input, a lowest bit and a next lowest bit of the first multiplicative input, a highest bit and a next highest bit of the second multiplicative input, a lowest bit and a next lowest bit of the second multiplicative input to generate an XOR result; and
a plurality of AND gates, configured to perform AND calculation for the highest bit of the first multiplicative input and the highest bit of the second multiplicative input, the next highest bit of the first multiplicative input and the next highest bit of the second multiplicative input, the next lowest bit of the first multiplicative input and the next highest bit of the second multiplicative input, the lowest bit of the first multiplicative input and the lowest bit of the second multiplicative input to generate an AND result;
wherein the multiplicative arithmetic circuit is configured to generate the multiplicative output according to the XOR result and the AND result.

2. The AES circuit module of claim 1, further comprising:
a shift rows/inverse shift rows arithmetic unit, coupled to the substitution byte/inverse substitution byte unit, configured to perform a circular shift for the output state array from the substitution byte/inverse substitution byte unit to generate a fifth state array; and
a mix columns/inverse mix columns arithmetic unit, coupled to the shift rows/inverse shift rows arithmetic unit, configured to perform a multiplication arithmetic for the fifth state array.

3. The AES circuit module of claim 1, wherein the first tier circuit unit comprises an isomorphism mapping module and an inversion affine transformation module.

4. The AES circuit module of claim 1, wherein the fifth tier circuit unit comprises an inversion isomorphism mapping module and an affine transformation module.

5. The AES circuit module of claim 1, wherein the constant multiplicative square arithmetic circuit is configured to generate a constant multiplicative square output according to a constant multiplicative square input, wherein the constant multiplicative square input includes four bits, and the constant multiplicative square arithmetic circuit comprises:
a plurality of XOR gates, configured to respectively perform XOR calculation for a highest bit and a lowest bit, the highest bit and a next highest bit, the next highest bit and a next lowest bit of the constant multiplicative square input to generate the constant multiplicative square output.

6. The AES circuit module of claim 1, wherein an input state array of the second tier circuit unit is an output result of a multiplexer with an input of the first state array.

7. The AES circuit module of claim 6, wherein a first multiplicative input, a second multiplicative input of the multiplicative arithmetic circuit of the second tier circuit unit and a constant multiplicative square input of the constant multiplicative square arithmetic circuit are determined by the output result.

8. The AES circuit module of claim 1, wherein a multiplicative inverse element input of the multiplicative inverse element circuit of the third tier circuit unit is determined by a result of performing XOR calculation of the plurality of second state arrays of the second tier circuit unit.

9. The AES circuit module of claim 1, wherein a first multiplicative input, a second multiplicative input of the plurality of multiplicative arithmetic circuits of the fourth tier circuit unit are determined by the third state array of the third tier circuit unit.

10. The AES circuit module of claim 1, wherein the first state array includes a first bit amount, and the plurality of second state arrays, the third state array and the plurality of fourth state arrays include a second bit amount.

11. The AES circuit module of claim 1, wherein the input state array is generated by plaintext data.

12. A single round advanced encryption standard circuit module, comprising:
a substitution byte/inverse substitution byte unit, configured to substitute elements of an input state array to generate an output state array, wherein the substitution byte/inverse substitution byte unit comprises:
a first tier circuit unit, configured to generate a first state array according to the input state array;
a second tier circuit unit, including a constant multiplicative square arithmetic circuit and a multiplicative arithmetic circuit, coupled to the first tier circuit unit and configured to generate a plurality of second state arrays according to the first state array;
a third tier circuit unit, including a multiplicative inverse element circuit, coupled to the second tier circuit unit, configured to generate a third state array according to the plurality of second state arrays;
a fourth tier circuit unit, including a plurality of multiplicative arithmetic circuits, coupled in parallel to the third tier circuit unit, configured to generate a plurality of fourth state arrays according to the third state array; and a fifth tier circuit unit, configured to generate the output state array according to the plurality of fourth state arrays;

wherein the first state array, the plurality of second state arrays, the third state array and the plurality fourth state arrays are represented by register-transfer level codes;

wherein the substitution byte/inverse substitution byte unit is implemented by composite field arithmetic (CFA) of sharing operators and operands;

wherein the multiplicative inverse element circuit is configured to generate a multiplicative inverse element output according to a multiplicative inverse element input, wherein the multiplicative inverse element input and the multiplicative inverse element output include four bits, and the multiplicative inverse element circuit comprises:

an XOR gate;
a plurality of NOR gates;
a plurality of AND gates; and
a plurality of multiplexers;

wherein the multiplicative inverse element circuit is configured to output a highest bit and a next highest bit of the multiplicative inverse element output according to the multiplicative inverse element input, a next highest bit and a next lowest bit of negation of the multiplicative inverse element input;

wherein the multiplicative inverse element circuit is configured to output a lowest bit and a next lowest bit of the multiplicative inverse element output according to the multiplicative inverse element input and negation of the multiplicative inverse element input.

13. The AES circuit module of claim 12, wherein the lowest bit and the next lowest bit of the multiplicative inverse element output are simplified by a Karnaugh map.

* * * * *